(12) United States Patent
Watanabe (10) Patent No.: US 7,903,365 B2
(45) Date of Patent: Mar. 8, 2011

(54) MAGNETIC STORAGE DEVICE AND CONTACT DETECTION METHOD

(75) Inventor: Jun Watanabe, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 0 days.

(21) Appl. No.: 12/476,828

(22) Filed: Jun. 2, 2009

(65) Prior Publication Data

US 2010/0020439 A1 Jan. 28, 2010

(30) Foreign Application Priority Data

Jul. 22, 2008 (JP) ................................ 2008-188245

(51) Int. Cl.
*G11B 21/02* (2006.01)
*G11B 27/36* (2006.01)
*G11B 15/46* (2006.01)
(52) U.S. Cl. ............................ 360/75; 360/31; 360/73.03
(58) Field of Classification Search ........................ None
See application file for complete search history.

(56) References Cited

U.S. PATENT DOCUMENTS

| 5,594,595 | A | * | 1/1997 | Zhu ................................. | 360/31 |
| 5,757,573 | A | * | 5/1998 | Tokuyama et al. ............. | 360/75 |
| 2008/0158715 | A1 | * | 7/2008 | Hirano et al. .................. | 360/75 |
| 2010/0157454 | A1 | * | 6/2010 | Chen et al. ..................... | 360/30 |

FOREIGN PATENT DOCUMENTS

| JP | A 3-54780 | 3/1991 |
| JP | A 5-20635 | 1/1993 |
| JP | A 9-16953 | 1/1997 |
| JP | A 9-282601 | 10/1997 |
| JP | A 2005-4909 | 1/2005 |

* cited by examiner

*Primary Examiner* — Andrew L Sniezek
(74) *Attorney, Agent, or Firm* — Greer, Burns & Crain, Ltd.

(57) ABSTRACT

A magnetic storage device includes a magnetic disk having a protective film and a lubricant layer formed on the protective film, a head stack assembly including a head operable to read information from and write information to the magnetic disk, and a suspension configured to support the head, a vibration detection sensor operable to output a detection signal to detect vibration of the head stack assembly, and an extraction unit operable to extract a specific frequency range from the detection signal outputted by the vibration detection sensor, the specific frequency range including a natural frequency of the head stack assembly but not including a natural frequency of an air film on the head.

11 Claims, 11 Drawing Sheets

DISK A

Fig. 5B

DISK B

MAGNETIC STORAGE DEVICE AND CONTACT DETECTION METHOD

CROSS-REFERENCE TO RELATED APPLICATION

This application is based upon and claims the benefit of priority of the prior Japanese Patent Application No. 2008-188245, filed on Jul. 22, 2008, the entire contents of which are incorporated herein by reference.

FIELD

The present invention relates to a magnetic storage device and a contact detection method.

BACKGROUND

In a magnetic disk device, a slider having a magnetic head flies at a location that is extremely close to a surface of a disk by using an airflow produced by rotation of the disk. By reducing the flying height of the magnetic head, it is possible to increase the sensibility of the magnetic head and prevent unnecessary spread of a magnetic field. Therefore, reduction in flying height of a magnetic head has been required to increase the capacity of a magnetic disk device.

Recently, the flying height of magnetic heads has been reduced by improvement in design of flying surfaces and by improvement in technology of processing sliders. Furthermore, a method of actively controlling the flying height has been proposed. For example, a resistor for heating (i.e., a heater) is provided on a portion of a head and is supplied with a current to generate heat. The generated heat deforms the head so that a portion of the head protrudes toward a surface of a disk to thereby reduce the flying height. See Japanese Laid-open Patent Publication No. 5-20635.

However, if the flying height of a magnetic head is excessively reduced, the magnetic head may be in contact with a magnetic disk so as to generate vibration on the magnetic head due to a frictional force. The vibration of the magnetic head may inhibit stable recording and reading and cause abrasion of the magnetic head and the magnetic disk. The abrasion of the magnetic head and the magnetic disk may cause corrosion or discharge in the magnetic head and the magnetic disk. Therefore, it is desirable to avoid contact of the magnetic head with the magnetic disk in the magnetic disk device.

In this regard, methods of detecting contact of a magnetic head with a magnetic disk or of controlling the flying height of a magnetic head have recently been proposed by Japanese Laid-open Patent Publication Nos. 3-54780, 9-16953, 9-282601, and 2005-4909.

Generally, a magnetic disk includes a substrate, a recording layer formed on a surface of the substrate, a protective film, and a lubricant layer. While the protective film is solid, the lubricant layer forms a fluid lubrication region. Therefore, the magnetic head should be prevented from contact with the protective film more keenly than contact with the lubricant layer.

However, the techniques disclosed by the above-identified Publication Nos. 3-54780 and 9-16953 cannot distinguish contact with a protective film from contact with a lubricant layer because they merely obtain an output value of a vibration detection sensor.

The above-identified Publication No. 9-282601 discloses that a contact judgment process is performed when frequency components other than natural frequencies of an actuator and a suspension (e.g., 50 kHz to 500 kHz) are detected. The frequency components other than natural frequencies of an actuator and a suspension are equivalent to a natural frequency of an air film on the head. Thus, the frequencies used for the contact judgment do not reflect vibration caused by contact of the magnetic head with the magnetic disk. Accordingly, contact of the magnetic head with the protective film may not be detected with accuracy.

The above-identified Publication No. 2005-4909 discloses that contact with a protective film is distinguished from contact with a lubricant layer based on differences of output values from a detection sensor, i.e., differences of amplitudes of output voltages. However, since only the amplitudes of output voltages are used for the determination, vibration of a magnetic head caused by factors other than contact (e.g., a seek operation) may mistakenly be detected as contact of the magnetic head with the magnetic disk. Therefore, this method may not accurately detect contact of the magnetic head with the magnetic disk.

SUMMARY

According to an aspect of the present invention, there is provided a magnetic storage device including: a magnetic disk having a protective film and a lubricant layer formed on the protective film; a head stack assembly including a head operable to read information from and write information to the magnetic disk, and a suspension configured to support the head; a vibration detection sensor operable to output a detection signal to detect vibration of the head stack assembly; and an extraction unit operable to extract a specific frequency range from the detection signal outputted by the vibration detection sensor, the specific frequency range including a natural frequency of the head stack assembly but not including a natural frequency of an air film on the head.

DESCRIPTION OF EMBODIMENTS

A magnetic storage device according to an embodiment of the present invention will be described in detail with reference to FIGS. 1 to 11.

Figure 1:
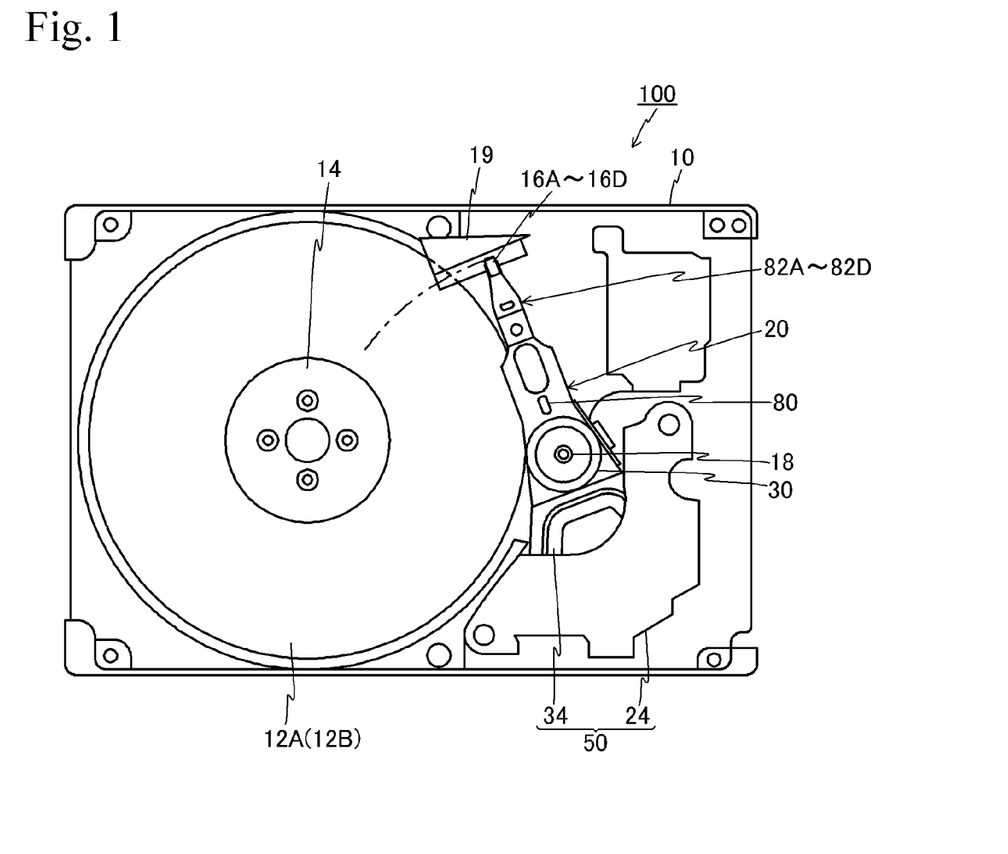
FIG. 1 is a plan view illustrating an internal structure of a hard disk drive (HDD) according to an embodiment of the present invention.

FIG. 1 illustrates an internal structure of a hard disk drive (HDD) 100 as a magnetic storage device according to an embodiment of the present invention. As illustrated in FIG. 1, the HDD 100 includes a box-shaped frame 10, magnetic disks 12A and 12B housed in a space (receptacle space) inside of the frame 10, a spindle motor 14, and a head stack assembly (HSA) 20. The magnetic disk 12B is not illustrated in FIG. 1 because it is located behind the magnetic disk 12A. Although the frame 10 is practically formed by a base and a top cover, FIG. 1 only illustrates the base for the purpose of illustration.

Figure 3:
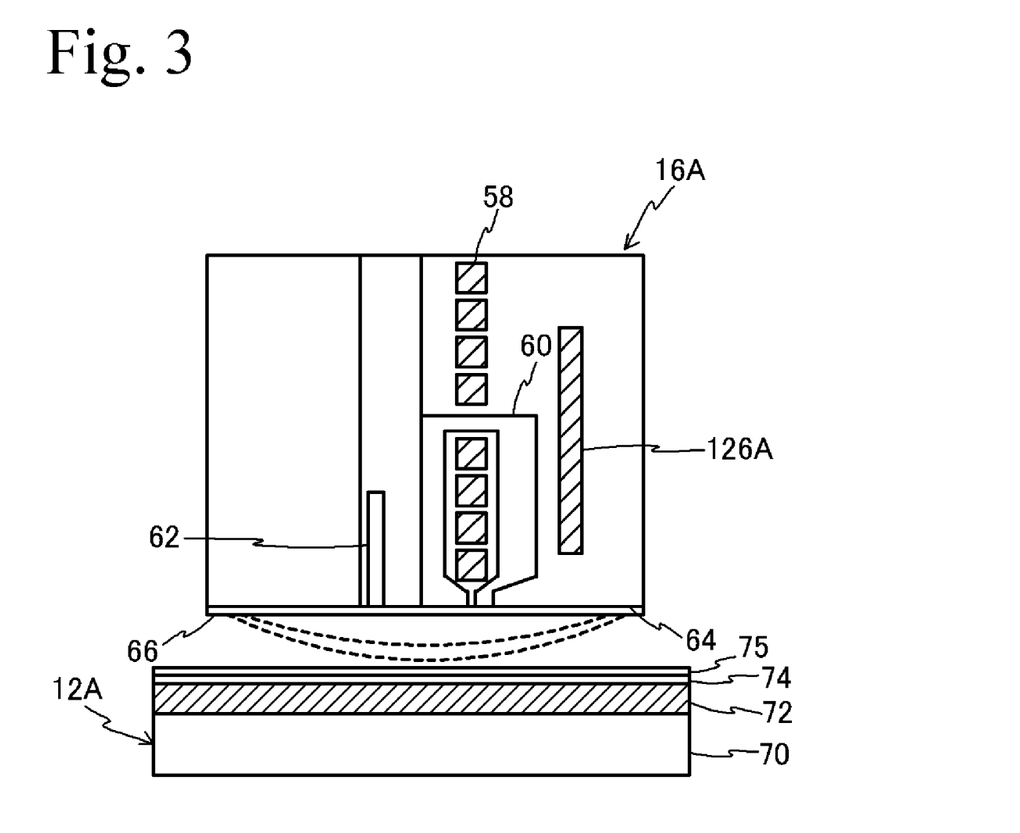
FIG. 3 is a view illustrating an arrangement of a magnetic head and a magnetic disk in the HDD illustrated in FIG. 1.

Each of the magnetic disks 12A and 12B has front and rear faces serving as recording surfaces. These magnetic disks 12A and 12B are rotated together about the rotation axis at a high speed of, for example, 4,200 rpm to 15,000 rpm by the spindle motor 14. As illustrated in FIG. 3, the magnetic disk 12A includes a substrate 70, a recording film 72 formed on an upper surface of the substrate 70, a protective film 74 formed on the recording film 72, and a lubricant layer 75 on the protective film 74. The lubricant layer 75 serves to reduce frictional forces or abrasion caused by contact with the magnetic head. The protective film 74 serves to protect the recording film 72.

Although not illustrated in FIG. 3, the magnetic disk 12A also includes a recording film, a protective film, and a lubricant layer on a lower surface of the substrate 70. The magnetic disk 12B has the same structure as the magnetic disk 12A.

Figure 2A:
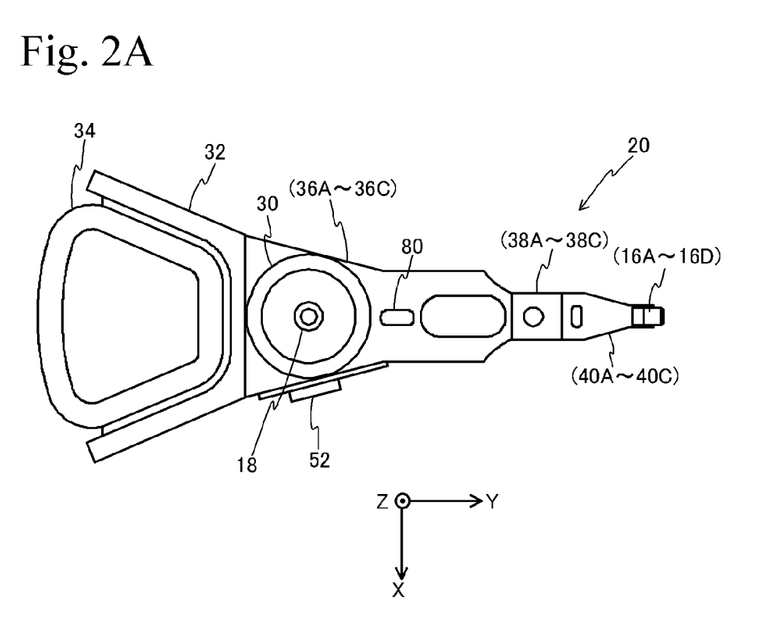
FIGS. 2A and 2B are views illustrating a structure of a head stack assembly (HSA) in the HDD illustrated in FIG. 1.
Figure 2B:
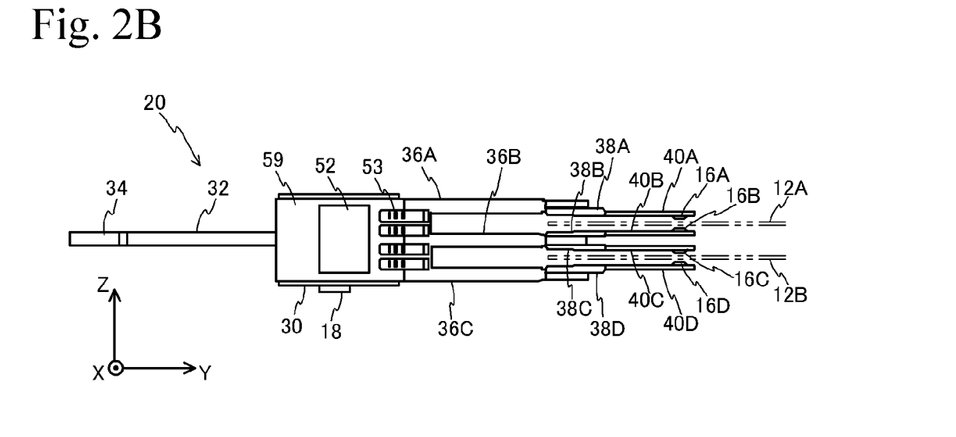

FIG. 2A is a plan view illustrating the HSA 20. In the following description, a transverse direction of the HSA 20 is defined as an X-axis direction, whereas a longitudinal direction of the HSA 20 is defined as a Y-axis direction. A direction perpendicular to both of the X-axis direction and the Y-axis direction is defined as a Z-axis direction. FIG. 2B illustrates the HSA 20 as viewed in the negative direction of the X-axis.

As illustrated in FIGS. 2A and 2B, the HSA 20 includes a cylindrical housing portion 30, a fork portion 32 fixed to an end of the housing portion 30 in the negative direction of the Y-axis, a coil 34 supported in the fork portion 32, three carriage arms 36A, 36B, and 36C fixed to the housing portion 30 at predetermined intervals in the height direction (the Z-axis direction) of the HSA 20, four magnetic heads 16A, 16B, 16C, and 16D supported by the three carriage arms 36A-36C, and a head IC 52 provided on a sidewall of the housing portion 30. A bearing member 18 is provided at a central portion of the housing portion 30. The HSA 20 is coupled to the frame 10 by the bearing member 18 so as to be rotatable about the Z-axis. Furthermore, as illustrated in FIG. 1, a magnetic pole unit 24 including a permanent magnet is fixed to the frame 10. The coil 34 of the HSA 20 and the magnetic pole unit 24 form a voice coil motor (VCM) 50. The HSA 20 is operable to swing about the bearing member 18 by the voice coil motor 50. In FIG. 1, the swinging movement is indicated by a chain line.

For example, the carriage arms 36A-36C are formed by punching stainless plates or extruding aluminum material.

As illustrated in FIG. 2B, a head suspension 40A is attached to the carriage arm 36A via a base plate 38A. The magnetic head 16A is mounted on a lower surface at an end of the head suspension 40A in the positive direction of the Y-axis. The magnetic head 16A is mounted to the head suspension 40A in a state in which it is held by a head slider (not illustrated). The magnetic head 16A, the head slider, and the head suspension 40A form a head gimbal assembly (HGA) 82A (see FIG. 1).

Similarly, a head suspension 40B is attached to the carriage arm 36B via a base plate 38B. The magnetic head 16B is mounted on an upper surface at an end of the head suspension 40B in the positive direction of the Y-axis. In this case, the magnetic head 16B, a head slider (not illustrated), and the head suspension 40B form an HGA 82B (see FIG. 1). Furthermore, a head suspension 40C is attached to the carriage arm 36B via a base plate 38C. The magnetic head 16C is mounted on a lower surface at an end of the head suspension 40C in the positive direction of the Y-axis. The magnetic head 16C, a head slider (not illustrated), and the head suspension 40C form an HGA 82C (see FIG. 1). A head suspension 40D is attached to the carriage arm 36C via a base plate 38D. The magnetic head 16D is mounted on an upper surface at an end of the head suspension 40D in the positive direction of the Y-axis. The magnetic head 16D, a head slider (not illustrated), and the head suspension 40D form an HGA 82D (see FIG. 1).

As illustrated in FIG. 2B, the magnetic heads 16A and 16B are vertically opposed (in the Z-axis direction) so as to interpose the magnetic disk 12A therebetween. The magnetic heads 16C and 16D are vertically opposed (in the Z-axis direction) so as to interpose the magnetic disk 12B therebetween.

FIG. 3 illustrates the magnetic head 16A together with the magnetic disk 12A. The magnetic head 16A has a head body formed of ceramics or the like. The magnetic head 16A includes a write element and a read element 62 in the head body. The write element includes a recording coil 58 and a recording core 60, and the read element 62 is disposed adjacent to the recording core 60. For example, the write element may comprise an element using a magnetic field produced in a thin-film coil pattern to write data to the magnetic disk 12A. For example, the read element 62 may comprise a giant magnetoresistance (GMR) element or a tunneling magnetoresistance (TMR) element, which use changes in resistance of a spin valve film or a tunneling film to read data from the magnetic disk 12A. The magnetic head 16A has an air bearing surface (ABS) 64 facing the magnetic disk 12A. A protective film 66 is formed on the air bearing surface 64.

Furthermore, in the present embodiment, a heater 126A is provided near the recording core 60 of the magnetic head 16A. When the heater 126A is supplied with power and heated, the ABS surface 64 (flying surface) of the magnetic head 16A expands and protrudes toward the magnetic disk 12A. A distance from a lower end of the read element 62 to the recording film 72 of the magnetic disk 12A is defined as a clearance (space) between the magnetic head 16A and the magnetic disk 12A.

Each of the magnetic heads 16B-16D has the same structure as the above-described magnetic head 16A. In other words, each of the magnetic heads 16B-16D has the same functions as the magnetic head 16A illustrated in FIG. 3, so that clearances between ABS surfaces of the magnetic heads 16B-16D and the magnetic disks can be adjusted by respective heaters (not illustrated).

Referring back to FIG. 2B, each of the head suspensions 40A-40D cantilevers the corresponding magnetic head 16A-16D by functions of gimbal springs (not illustrated) provided on its end in the positive direction of the Y-axis. A pressing force is applied to the magnetic head 16A toward the surface of the magnetic disk 12A from the head suspension 40A. When the magnetic disk 12A rotates, airflow is produced on the surface of the magnetic disk 12A by the rotation of the magnetic disk 12A. Accordingly, a buoyant force is applied to the magnetic head 16A by the airflow. The buoyant force and the aforementioned pressing force are balanced such that the magnetic head 16A continues to fly above the magnetic disk 12A with relatively high rigidity while the magnetic disk 12A is rotating. Each of the other head suspensions 40B-40D also operates in the same manner as the head suspension 40A, and the details thereof are not described herein. While the magnetic heads 16A-16D are flying above the corresponding magnetic disk, the HSA 20 swings about the bearing member 18 to position the recording/reproducing heads into desired recording tracks on the magnetic disks 12A and 12B.

As illustrated in FIG. 2B, the head IC 52 is mounted on a flexible printed circuit board 59 fixed at an end of the housing portion 30 in the positive direction of the X-axis. Wiring patterns and terminals 53 are formed on the flexible printed circuit board 59. A flexible cable connector (not illustrated) is connected to the flexible printed circuit board 59. The flexible cable connector connects the flexible printed circuit board 59 to a printed circuit board of the HDD 100.

Furthermore, ends of a long tail (signal transit element), which is not illustrated, are connected respectively to the terminals 53 on the flexible printed circuit board 59. The long tail has opposite ends connected to the corresponding magnetic heads 16A-16D.

In the present embodiment, as illustrated in FIGS. 1 and 2A, an acoustic emission (AE) sensor 80 including a piezoelectric element is provided on an upper surface of the carriage arm 36A. The AE sensor 80 serves as a vibration detection sensor for detecting vibration of the head stack assembly (HSA) 20 including the magnetic heads 16A-16D. The AE sensor 80 may employ any type of sensors as long as it can detect a natural frequency of the HSA 20. For example, the AE sensor 80 may have a frequency range of 50 kHz to 500 kHz. In this case, the AE sensor 80 may have a band higher than a sampling frequency for a head positioning control.

Figure 4:
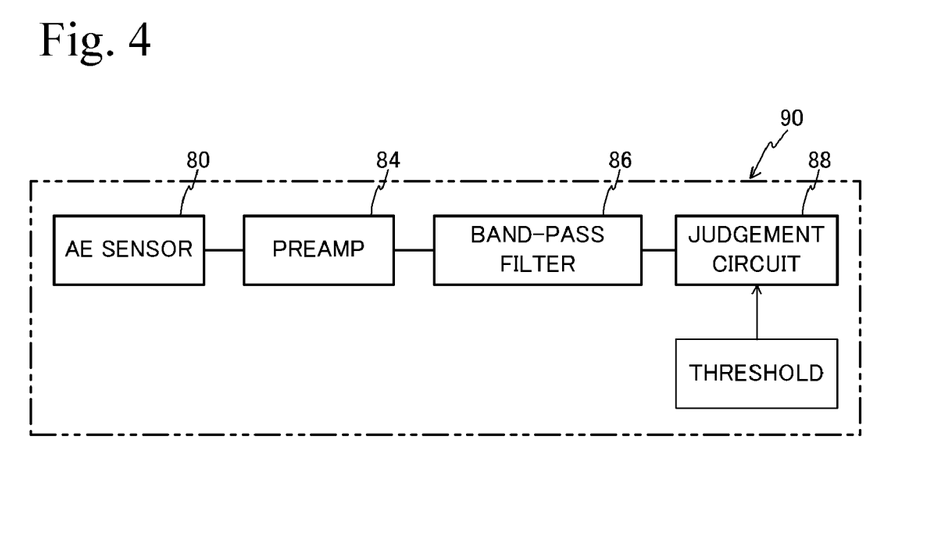
FIG. 4 is a block diagram illustrating a contact detection circuit in the HDD illustrated in FIG. 1.

FIG. 4 is a block diagram illustrating a contact detection circuit 90 including the AE sensor 80. As illustrated in FIG. 4, the contact detection circuit 90 includes the AE sensor 80, a preamplifier 84, a band-pass filter 86 as an extraction unit operable to extract a specific frequency range from the signal of the AE sensor 80, and a judgment circuit 88 as a contact prevention unit operable to prevent the magnetic head from contact with a recording area on a surface of the magnetic disk when the extracted signal in the specific frequency range exceeds a predetermined threshold.

A signal outputted from the AE sensor 80 is amplified by the preamplifier 84. The band-pass filter 86 outputs only a signal of a predetermined frequency band (specific frequencies) to the judgment circuit 88. The judgment circuit 88 compares a signal value (V) of the specific frequencies with a predetermined threshold to determine occurrence of a specific type of vibration.

Next, there will be described a method of determining a predetermined frequency band (specific frequencies) for the band-pass filter 86.

Figure 5A:
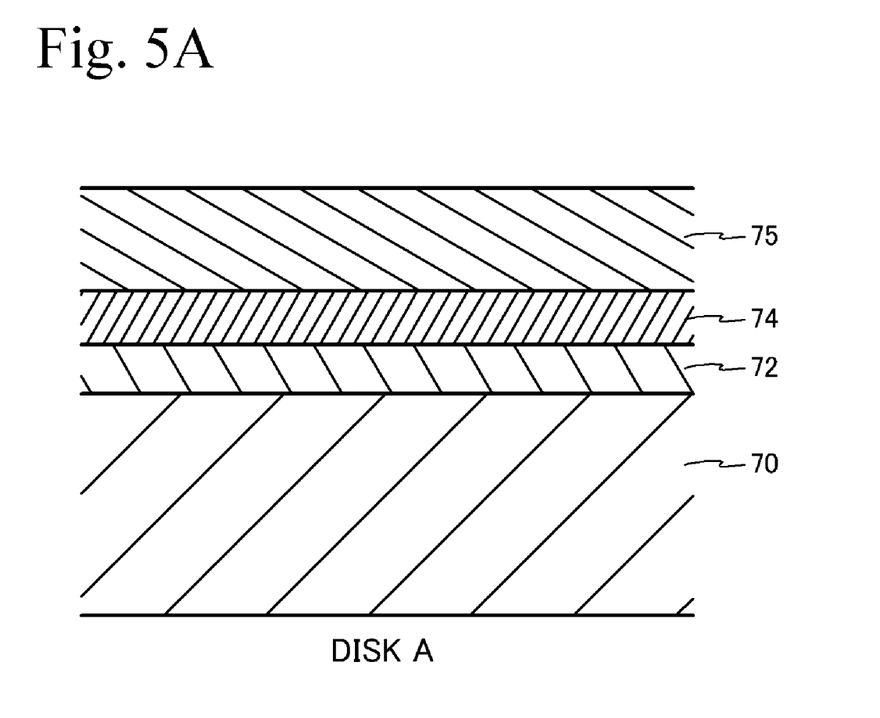
FIGS. 5A and 5B are cross-sectional views illustrating multilayer structures of disks A and B used in experiments.
Figure 5B:
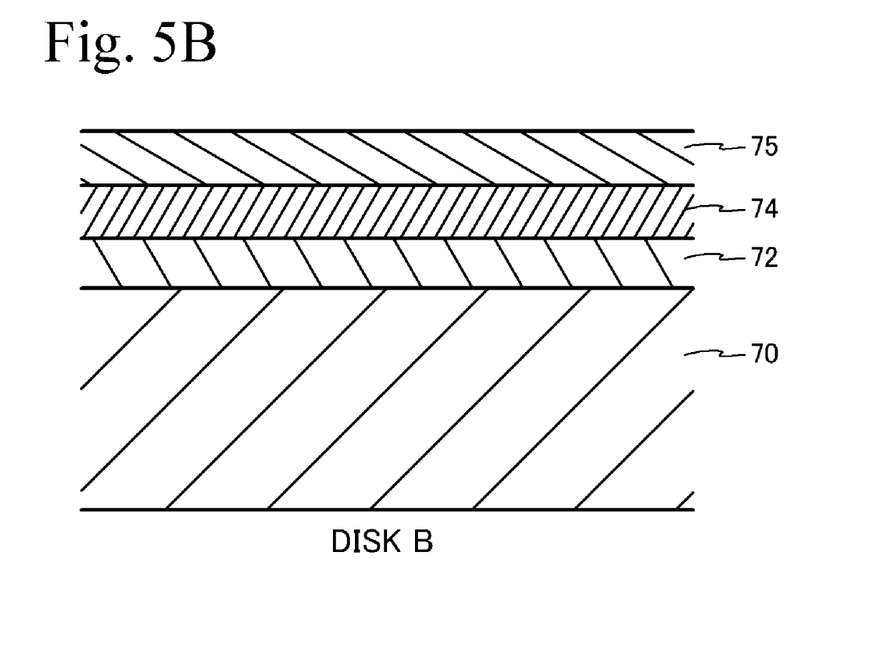

FIGS. 5A and 5B are cross-sectional views illustrating two types of magnetic disks A and B used to determine specific frequencies for the band-pass filter 86. As illustrated in FIGS. 5A and 5B, the magnetic disks A and B were configured such that the magnetic disk A had a lubricant layer 75 thicker than a lubricant layer 75 of the magnetic disk B.

Figure 6A:
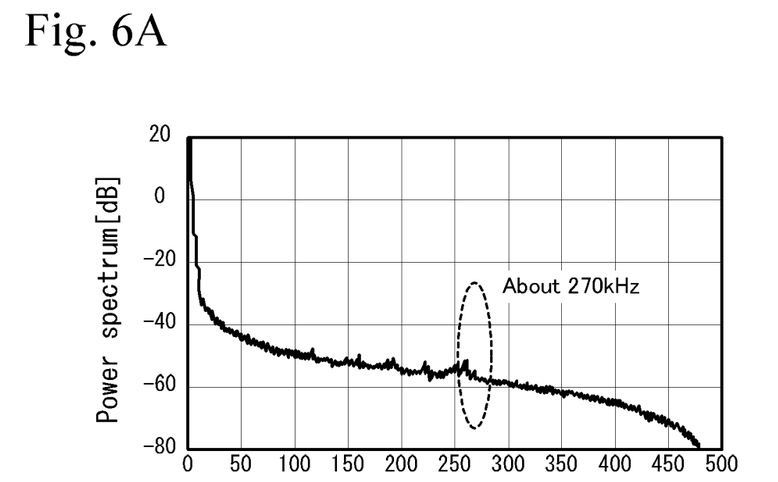
FIGS. 6A to 6C are graphs illustrating signal spectra obtained in the experiment using the disk A illustrated in FIG. 5A.
Figure 6B:
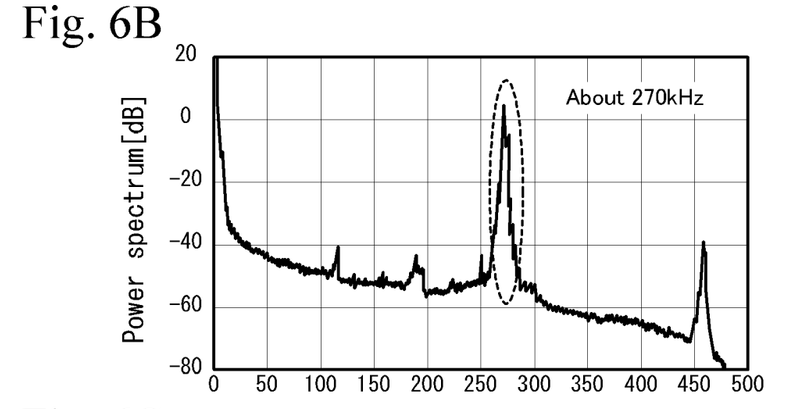
Figure 6C:
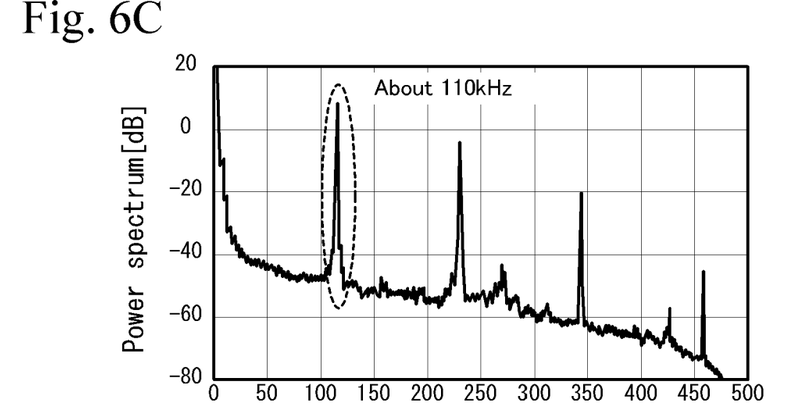
Figure 7A:
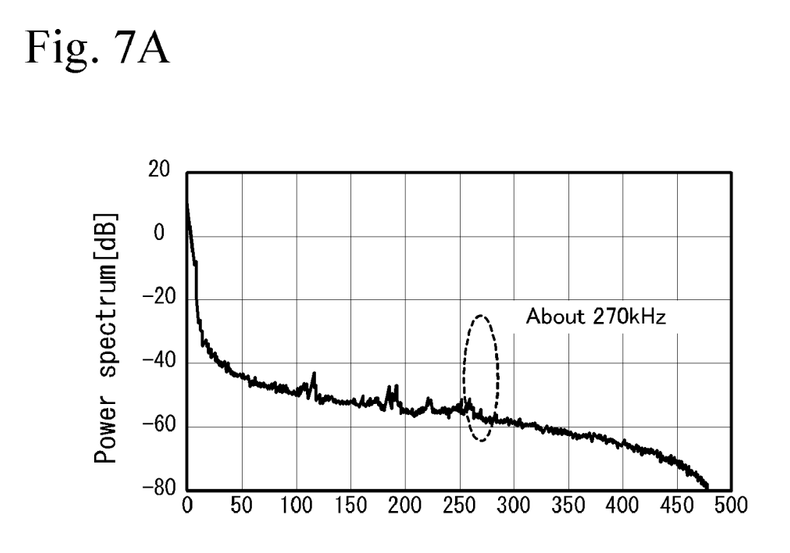
FIGS. 7A and 7B are graphs illustrating signal spectra obtained in the experiment using the disk B illustrated in FIG. 5B.
Figure 7B:
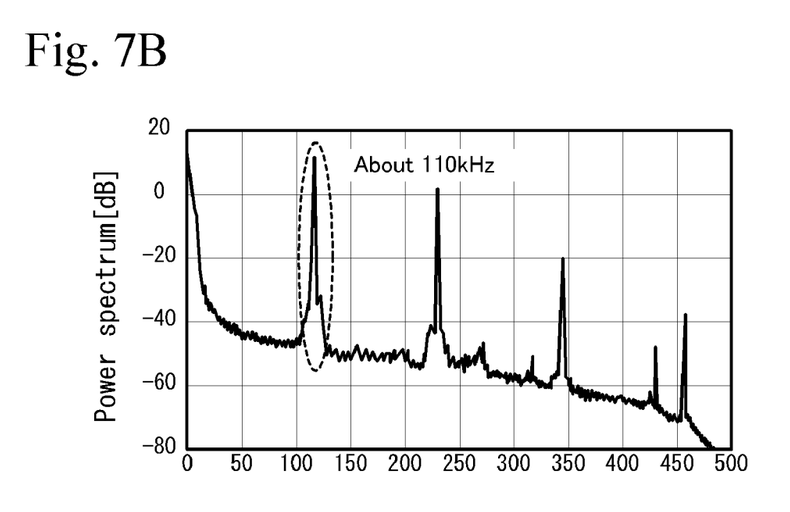

In an experiment, a current was supplied to the heater so that the magnetic head gradually protruded toward each type of disks A and B. At that time, the output of the AE sensor 80 was monitored. FIGS. 6A to 6C illustrate spectra of a signal outputted while the magnetic head was protruding toward the disk A (until the magnetic head was brought into contact with the protective film 74). FIGS. 7A and 7B illustrate spectra of a signal outputted while the magnetic head was protruding toward the disk B (until the magnetic head was brought into contact with the protective film 74).

FIGS. 6A and 7A illustrate spectra of a signal outputted when the magnetic head was in contact with the lubricant layer 75. FIGS. 6B and 7B illustrate spectra of a signal outputted when the magnetic head further protruded from the states illustrated in FIGS. 6A and 7A. In this case, since the lubricant layer 75 of the disk B was thinner, the magnetic head was in contact with the protective film 74 of the disk B in the state illustrated in FIG. 7B. Since the lubricant layer 75 of the disk A was thicker, the magnetic head was not in contact with the protective film 74 in the state illustrated in FIG. 6B. FIG. 6C illustrates a spectrum of a signal outputted when the magnetic head further protruded from the state illustrated in FIG. 6B until it is brought into contact with the protective film 74.

As can be seen from comparison of FIGS. 6A and 7A, the same frequency spectrum can be found around 270 kHz for both of the disks A and B at the beginning of the contact. In the states illustrated in FIGS. 6A and 7A, the magnetic head was only in contact with the lubricant layer 75. In this situation, abrasion was unlikely to be caused because the lubricant layer 75 formed a fluid lubrication region and thus generally provided a low coefficient of friction.

As can be seen from comparison of FIGS. 6B and 7B, a power spectrum for the disk A increased around a frequency of 270 kHz (see FIG. 6B), whereas a power spectrum for the disk B increased around a frequency of 110 kHz (see FIG. 7B).

Furthermore, when the amount of protrusion was further increased from the state illustrated in FIG. 6B, a peak was formed around 110 kHz as illustrated in FIG. 6C, which was similar to the peak seen in FIG. 7B for the disk B.

From these graphs, it is conceivable that a peak seen around a frequency of 110 kHz in a spectrum of the signal represents that the magnetic head is brought into contact with the protective film 74.

Next, there will be described an experiment to prove that a peak seen around a frequency of 110 kHz in a spectrum of a signal represents that the magnetic head is brought into contact with the protective film 74.

Figure 8A:
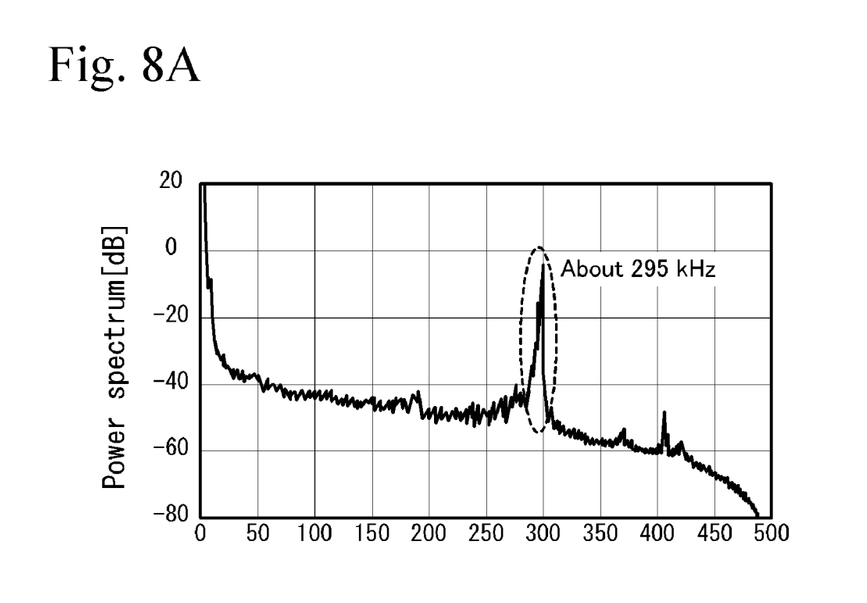
FIGS. 8A and 8B are graphs illustrating signal spectra obtained in an experiment where a head slider having a high air film stiffness was used with the disk B.
Figure 8B:
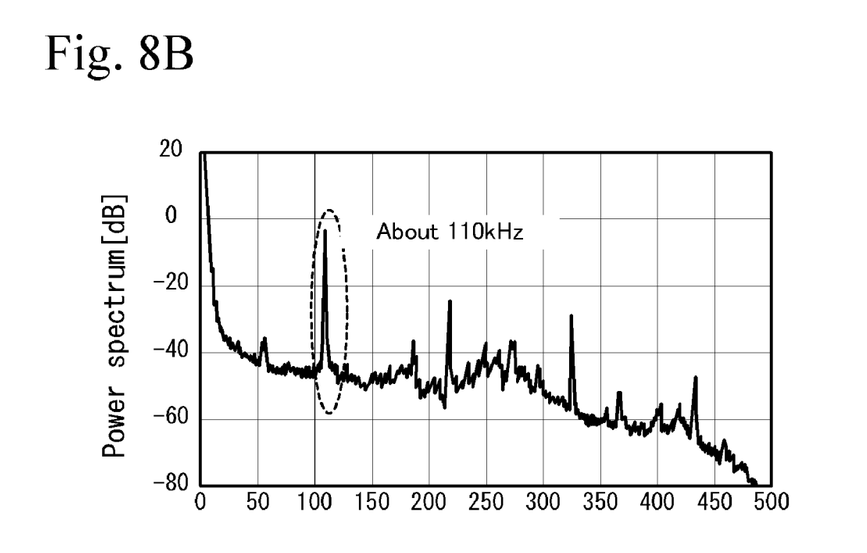

This experiment used a head slider (magnetic head) having an air film stiffness higher than the head slider (magnetic head) used in the above measurement (FIGS. 6A to 7B). The same measurement as described above in connection with the disk B was performed. FIGS. 8A and 8B illustrate spectra of a signal outputted in this experiment. FIG. 8A corresponds to FIG. 7A in the same contacting state. FIG. 8B corresponds to FIG. 7B in the same contacting state.

As can be seen from comparison of FIGS. 8A and 7A, when the head slider had a higher air film stiffness, a peak was seen at a frequency of 295 kHz, which is higher than 270 kHz seen in FIG. 7A, at the beginning of the contact (see FIG. 8A). The difference between those peaks was caused by the difference of the values in air film stiffness of the head slider. Thus, it is conceivable that the frequency of the peak represents a resonance frequency of the air film.

As can be seen from comparison of FIGS. 8B and 7B, when the magnetic head was in contact with the protective film 74 of the disk B, a peak was formed around a frequency of 110 kHz in either case. Thus, a peak was seen at a specific frequency, irrespective of the air film stiffness of the head slider. Accordingly, it is conceivable that this specific frequency is a natural frequency of the support structure (HSA 20) for the magnetic head. Furthermore, it is conceivable that the output at the natural frequency of the HSA 20 results from contact of the magnetic head with the protective film 74. Therefore, this experiment proved that a peak seen around a frequency of 110 kHz represents that the magnetic head was brought into contact with the protective film 74.

In view of the above results, in the present embodiment, the frequency band of the band-pass filter 86 is configured so as not to include a resonance frequency of an air film caused by contact with the lubricant layer, but to include a natural frequency of the HSA 20. More specifically, the frequency band of the band-pass filter 86 is configured so as not to include a frequency of 270 kHz or 295 kHz, but to include a neighborhood of a frequency of 110 kHz. For example, the frequency band of the band-pass filter 86 may be configured to have a range of 50 kHz to 250 kHz.

The resonance frequency of the air film and the natural frequency of the HSA 20 which are required to determine the frequency band of the band-pass filter 86 may be calculated from experimental results as described above or may be calculated by using simulation analysis. The vibration frequency varies depending upon types of the magnetic storage devices. Therefore, it is preferable to conduct the aforementioned experiments or simulation analysis for each type of the magnetic storage devices and configure the frequency band of the band-pass filter 86 for each type of the magnetic storage devices.

Next, a process using the contact detection circuit 90 illustrated in FIG. 4 to detect contact of the magnetic head (16A-16D) with the protective film 74 of the magnetic disk (12A and 12B) will be described with reference to a flow chart illustrated in FIG. 9.

Figure 9:
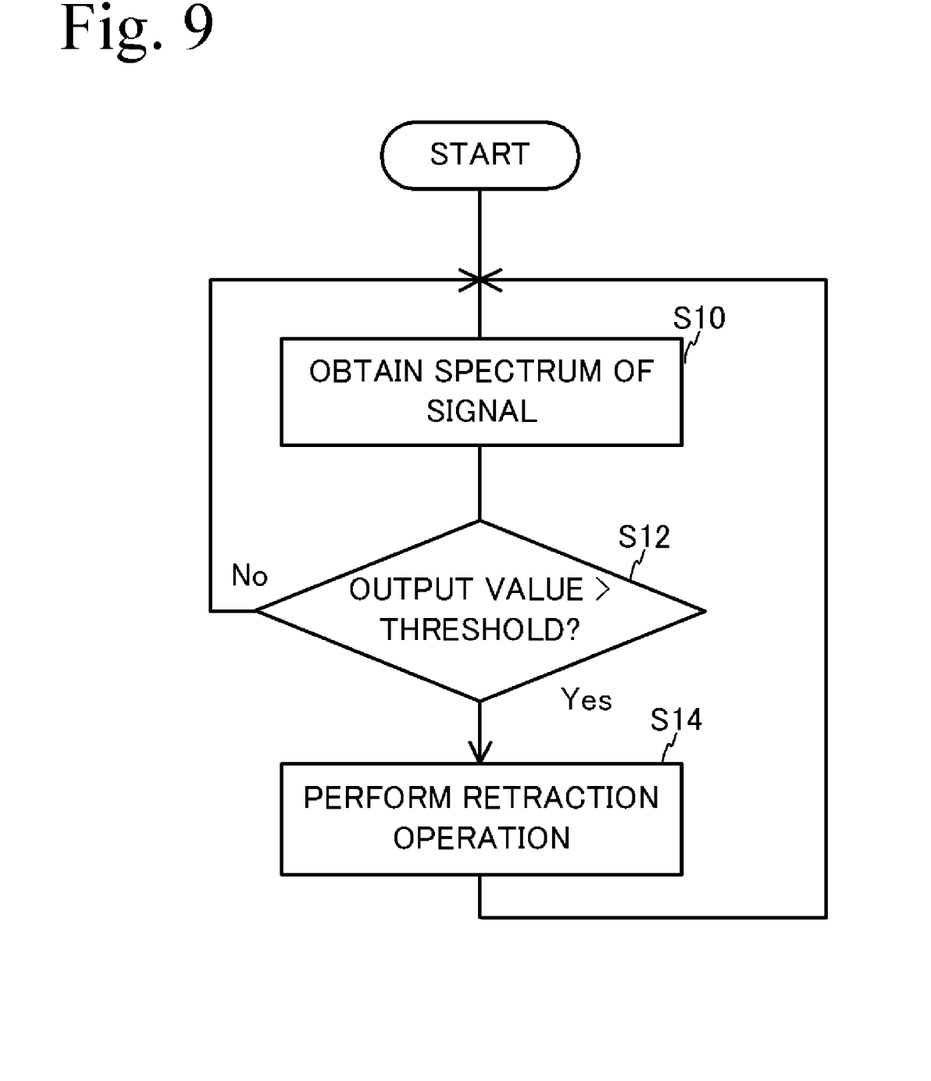
FIG. 9 is a flow chart illustrating a process performed in the contact detection circuit illustrated in FIG. 4.

In Step S10 of FIG. 9, the judgment circuit 88 in the contact detection circuit 90 obtains a spectrum of a signal, relating to the vibration of the HSA 20, outputted from the AE sensor 80 via the preamplifier 84 and the band-pass filter 86. It is assumed that the band-pass filter 86 is configured to have a frequency band of 50 kHz to 250 kHz as described above. Thus, the spectrum of a signal obtained by the judgment circuit 88 is limited within a frequency range of 50 kHz to 250 kHz.

Then, in Step S12, the judgment circuit 88 compares the spectrum (output value (V)) at frequencies of 50 kHz to 250 kHz, which has been obtained in Step S10, with a predetermined threshold. Thus, the judgment circuit 88 determines whether the output value (V) is greater than the threshold. If it is determined that the output value is greater than the threshold, then Step S14 proceeds. If it is determined that the output value is not greater than the threshold, the process returns to Step S10. The threshold may use a spectrum of a signal obtained when the magnetic head is not in contact with the magnetic disk, i.e., an output value under normal conditions. Alternatively, in view of errors of the output value or the like, the threshold may use values slightly larger than the output value under normal conditions.

The positive determination in Step S12 means that the magnetic head is in actual contact with the protective film 74 of the magnetic disk, which has a high coefficient of friction, and that the magnetic disk is likely to be worn with the magnetic head. In order to avoid such a situation in which the magnetic disk is likely to be worn with the magnetic head, the judgment circuit 88 retracts the magnetic head to a position other than a recording area of the magnetic disk in Step S14. For example, if the HDD 100 uses a load/unload system, the magnetic head may be retracted to an unload position in a ramp mechanism 19 illustrated in FIG. 1. If the HDD 100 uses a contact start stop (CSS) system, the magnetic head may be retracted to a CSS zone inside the magnetic disk.

Figure 10:
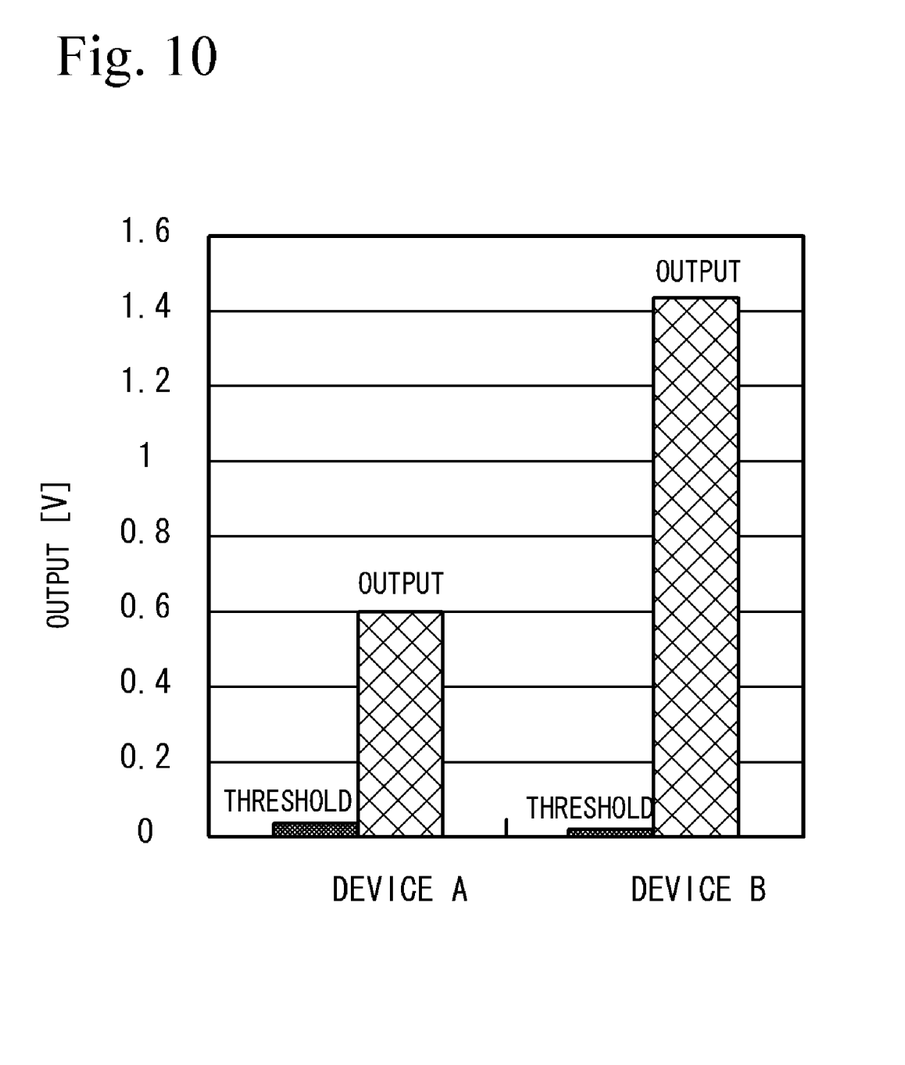
FIG. 10 is a diagram to explain advantages of retraction of a magnetic head.
Figure 11A:
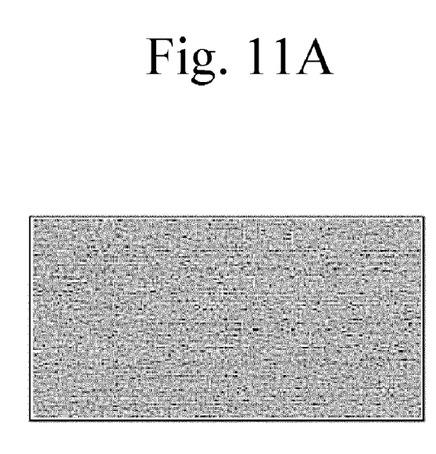
FIGS. 11A and 11B are diagrams to explain advantages of retraction of a magnetic head.

Advantages of retraction of the magnetic head from the recording area of the magnetic disk will be described with reference to FIGS. 10, 11A and 11B.

In an example, two devices A and B were prepared as hard disk drives. An output value of the AE sensor 80 from each device was obtained. As illustrated in FIG. 10, the magnetic head of the device A was retracted to a retraction position when an output value exceeded a threshold. The magnetic head of the device B was not retracted to a retraction position.

Generally, a lubricant layer has a self-recovery function. Therefore, a damaged lubricant layer will be recovered in several days. In this point of view, the devices A and B were left for a period of time that is longer than the self-recovery period of the lubricant layer (e.g., a week). Surfaces of the disks in the devices A and B were then examined by a surface inspection device. FIGS. 11A and 11B illustrate the examination results, i.e., images of the disk surfaces.

Figure 11B:
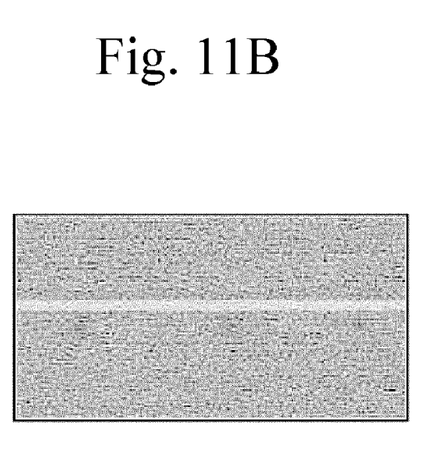

As illustrated in FIG. 11B, a contact scratch was seen on the surface of the disk in the device B, in which the magnetic head had not been retracted. This scratch means that the protective film 74 was worn due to contact of the magnetic head with the protective film 74. On the other hand, as illustrated in FIG. 11A, no damages were seen on the surface of the disk in device A, in which the magnetic head had been retracted. This means that no abrasion was caused on the protective film 74 and that the lubricant layer 75 had been self-recovered. Thus, as seen in the device A of FIG. 11A, damages to the magnetic disk can be minimized by performing a retraction operation in Step S14.

As described above, according to the present embodiment, the band-pass filter 86 extracts a specific frequency range (e.g., 50 kHz to 250 kHz) that includes a natural frequency of the HSA 20 (e.g., 110 kHz) but does not include a natural frequency of an air film on the magnetic head (e.g., 270 kHz or 295 kHz) from a signal detected by the AE sensor 80, which is operable to detect the vibration of the HSA 20. Therefore, contact of the magnetic head with the protective film 74 can be detected with high accuracy based on a signal in the specific frequency range. Furthermore, use of those detection results prevents the magnetic head from contact with the protective film 74. Accordingly, abrasion of the magnetic head or the protective film 74 is prevented from being caused. Thus, the accuracy of recording and reading can be enhanced, and the lifetime of the device can be extended.

Furthermore, according to the present embodiment, contact can be detected readily with high accuracy merely by comparing an output value in a specific frequency band (e.g., 50 kHz to 250 kHz) outputted from the band-pass filter 86 with a predetermined threshold.

In the above embodiment, when contact of the magnetic head with the protective film is detected, the magnetic head is prevented from contact with the recording area of the magnetic disk by retracting the magnetic head to a retraction position (the ramp mechanism 19 or the CSS zone). However, the present invention is not limited to those examples. For example, in order to prevent the magnetic head from contact with the protective film, the amount of protrusion of the magnetic head may be reduced by lowering the temperature of the heater provided in the magnetic head (by reducing a current supplied thereto). This control can avoid contact of the magnetic head with the protective film without interruption of recording or reading by the magnetic head.

Moreover, another control method may be employed to enlarge a distance between the magnetic disk and the magnetic head. For example, the rotational speed of the magnetic disk may be increased so as to increase a lift applied to the magnetic head. In this case, the same effects as those obtained by the heater control can be achieved as well.

In the above embodiment, the HSA 20 has a single AE sensor 80. Nevertheless, the HSA 20 may include a plurality of AE sensors 80. For example, four AE sensors may be provided on the HSA 20 so as to correspond to the four HGA 82A-82D. In this case, when an output value from any one of the AE sensors exceeds a threshold, all of the magnetic heads 16A to 16E may be retracted to a retraction position. Alternatively, when an output value from any one of the AE sensors exceeds a threshold, the rotational speed of the magnetic disks may be increased. When an output value from one of the AE sensors exceeds a threshold, the heater temperature may be lowered only for the magnetic head corresponding to that AE sensor.

In the above embodiment, the HDD 100 has two magnetic disks. Nevertheless, the HDD may have a single magnetic disk or three or more magnetic disks. The number of the magnetic heads may be changed depending upon the number of the magnetic disks. Furthermore, the number of the AE sensors 80 may be changed depending upon the number of the magnetic heads.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various change, substitutions, and alterations could be made hereto without departing from the spirit and scope of the invention.

What is claimed is:

1. A magnetic storage device comprising:
   a magnetic disk comprising a protective film and a lubricant layer formed on the protective film;
   a head stack assembly comprising a head configured to read information from and write information to the magnetic disk, and a suspension configured to support the head;
   a vibration detection sensor configured to output a detection signal in order to detect vibration of the head stack assembly;
   an extraction module configured to extract a specific frequency range from the detection signal outputted by the vibration detection sensor, the specific frequency range comprising a natural frequency of the head stack assembly but not comprising a natural frequency of an air film on the head; and
   a detector configured to compare the detection signal in the specific frequency range extracted by the extraction module with a predetermined threshold in order to detect contact of the head with the protective film of the magnetic disk.

2. The magnetic storage device of claim 1, further comprising a contact prevention module configured to prevent the head from contact with a recording area on a surface of the magnetic disk when the detection signal in the specific frequency range extracted by the extraction module exceeds a predetermined threshold.

3. The magnetic storage device of claim 2, wherein the contact prevention module is configured to retract the head to a retraction position that is not above the recording area of the magnetic disk.

4. The magnetic storage device of claim 2, wherein the head stack assembly further comprises a heater configured to adjust an amount of protrusion of the head,
   wherein the contact prevention module is configured to control the heater so as to reduce the amount of protrusion of the head.

5. The magnetic storage device of claim 2, further comprising a motor configured to rotate the magnetic disk,
   wherein the contact prevention module is configured to increase a rotational speed of the magnetic disk rotated by the motor so as to increase a flying height of the head above the magnetic disk.

6. A magnetic storage device comprising:
   a magnetic disk comprising a protective film and a lubricant layer formed on the protective film;
   a head stack assembly comprising heads configured to read information from and write information to the magnetic disk, and suspensions configured to support the heads;
   vibration detection sensors provided so as to correspond to the heads, the vibration detection sensors being configured to output detection signals in order to detect vibration of the heads; and
   an extraction module configured to extract a specific frequency range from the detection signals outputted by the vibration detection sensors, the specific frequency range comprising a natural frequency of the head stack assembly but not comprising a natural frequency of an air film on the heads; and
   a detector configured to compare the detection signal in the specific frequency range extracted by the extraction module with a predetermined threshold in order to detect contact of the heads with the protective film of the magnetic disk.

7. A method of detecting contact of a head with a magnetic disk comprising a protective film and a lubricant layer formed on the protective film, the head being provided in a head stack assembly so as to read information from and write information to the magnetic disk, the method comprising:
   outputting a detection signal to detect vibration of the head stack assembly;
   extracting a specific frequency range from the detection signal, the specific frequency range comprising a natural frequency of the head stack assembly but not comprising a natural frequency of an air film on the head; and
   comparing the extracted detection signal in the specific frequency range with a predetermined threshold to detect contact of the head with the protective film of the magnetic disk.

8. The method of claim 7, further comprising:
   preventing the head from contact with a recording area on a surface of the magnetic disk when the extracted detection signal in the specific frequency range exceeds a predetermined threshold.

9. The method of claim 8, wherein
   the preventing comprises retracting the head to a retraction position that is not above the recording area of the magnetic disk.

10. The method of claim 8, wherein
    the head stack assembly further comprises a heater configured to adjust an amount of protrusion of the head, and the preventing comprising:
    controlling the heater so as to reduce the amount of protrusion of the head.

11. The method of claim 8, wherein the preventing comprises:
    increasing a rotational speed of the magnetic disk so as to increase a flying height of the head above the magnetic disk.

* * * * *